United States Patent [19]

van der Lely

[11] 4,282,774
[45] Aug. 11, 1981

[54] TORQUE CONVERTER

[76] Inventor: Cornelis van der Lely, 7, Brüschenrain, Zug, Switzerland

[21] Appl. No.: 83,637

[22] Filed: Oct. 11, 1979

[30] Foreign Application Priority Data

Oct. 13, 1978 [NL] Netherlands ............. 7810296
Oct. 13, 1978 [NL] Netherlands ............. 7810297

[51] Int. Cl.³ .................. F16H 15/50; F16H 37/02
[52] U.S. Cl. .......................... 74/690; 74/191; 74/796
[58] Field of Search ............ 74/190, 191, 192, 690, 74/796, 773, 777, 198

[56] References Cited

U.S. PATENT DOCUMENTS

| | | | |
|---|---|---|---|
| 1,194,107 | 8/1916 | Whiteside | 74/690 |
| 1,762,199 | 6/1930 | Standish | 74/690 |
| 1,938,605 | 12/1933 | Mottlau | 74/690 |
| 2,062,901 | 12/1936 | Graham | 74/690 X |
| 2,686,432 | 8/1954 | Bergmann | 74/690 X |
| 2,807,964 | 10/1957 | Oushinsky | 74/191 X |
| 3,241,382 | 3/1966 | Temple | 74/191 |
| 3,285,083 | 11/1966 | Singer | 74/191 |
| 3,802,295 | 4/1974 | Lemmens | 74/796 |
| 4,098,145 | 7/1978 | Dickinson | 74/191 X |
| 4,232,561 | 11/1980 | Kashihara et al. | 74/796 X |

FOREIGN PATENT DOCUMENTS

1189823 3/1965 Fed. Rep. of Germany ........... 74/690
634915 3/1928 France .
1152946 2/1958 France .
1205687 2/1960 France ................... 74/191

*Primary Examiner*—C. J. Husar
*Assistant Examiner*—Moshe I. Cohen
*Attorney, Agent, or Firm*—Mason, Mason and Albright

[57] ABSTRACT

A torque converter has a housing for an input shaft and output shaft drivenly connected to one another with friction elements rotatably mounted on arms on pivotable holders. The holders are interconnected by the members so that rotation of the input shaft rotates its holder and, via the tie members, the output holder. The friction elements are thus flung outwardly into contact with annular control members within the housing on which they roll. The friction elements also abut and roll on one another, so that at least a major proportion of axial forces on the friction element in operation are held in equilibrium by the elements themselves. Rotation of the friction elements is transferred to the output shaft by planetary gearing on a common axis for the input and output shafts and on the rotation axes of the elements. The transmission ratio is varied by moving a control member towards and away from a second control member which changes the circumference of the path over which the elements roll. The holder is displaceable axially to accommodate this adjustment and maintain the friction elements in contact with one another. The geometrical configuration and disposition of the friction elements are arranged to support one another and mitigate load on their supporting parts.

29 Claims, 6 Drawing Figures

TORQUE CONVERTER

According to the present invention there is provided a torque converter comprising at least two friction elements which are mounted for rotation about respective rotary axes which are inclined to a main axis of the torque converter, each of the friction elements, in operation, frictionally engaging friction surfaces of the other one as well as a friction surface of a control member under the action of centrifugal force, and rolling on one another.

For a better understanding of the present invention and to show how it may be carried into effect, reference will now be made, by way of example only, to the accompanying drawings, in which.

Figure 4:
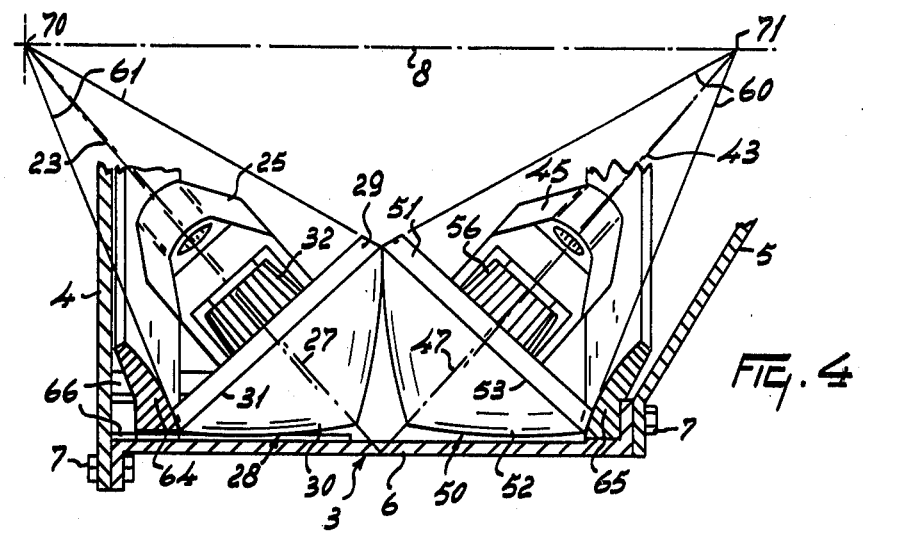
FIG. 4 is a sectional view taken on the lines IV—IV in FIG. 2 showing one operative condition of the torque converter.
Figure 5:
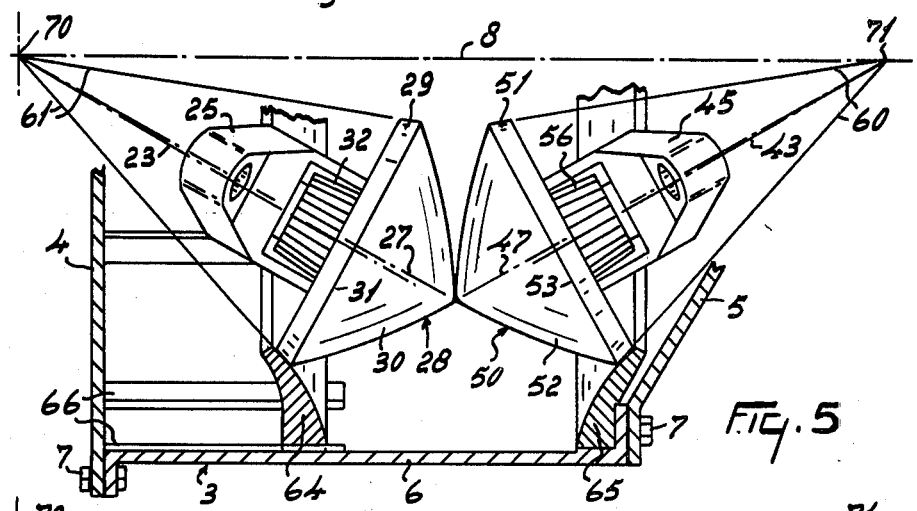
Figure 6:
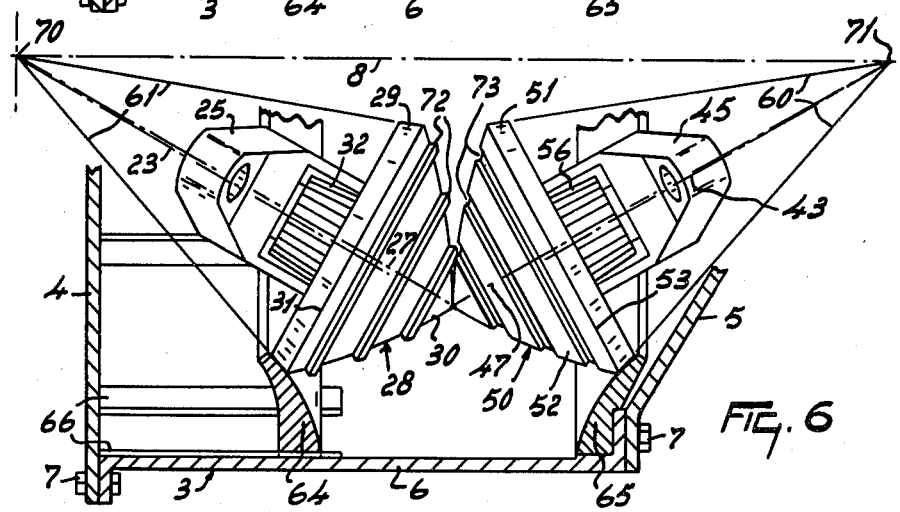

FIG. 5 corresponds to FIG. 4 but shows another operative condition of the torque converter; and FIG. 6 corresponds to FIG. 5, but shows a modified construction.

The torque converter of FIGS. 1 to 5 comprises an input shaft 1 and an output shaft 2, both of which are journalled in a housing 3. This housing 3 comprises a cylindrical portion 6 to which end portions 4 and 5 are rididly connected by bolts 7. The centerlines of the input shaft 1 and of the output shaft 2 lie on a common center line 8; which will be referred to in this description at the "main axis" of the torque converter.

Figure 1:
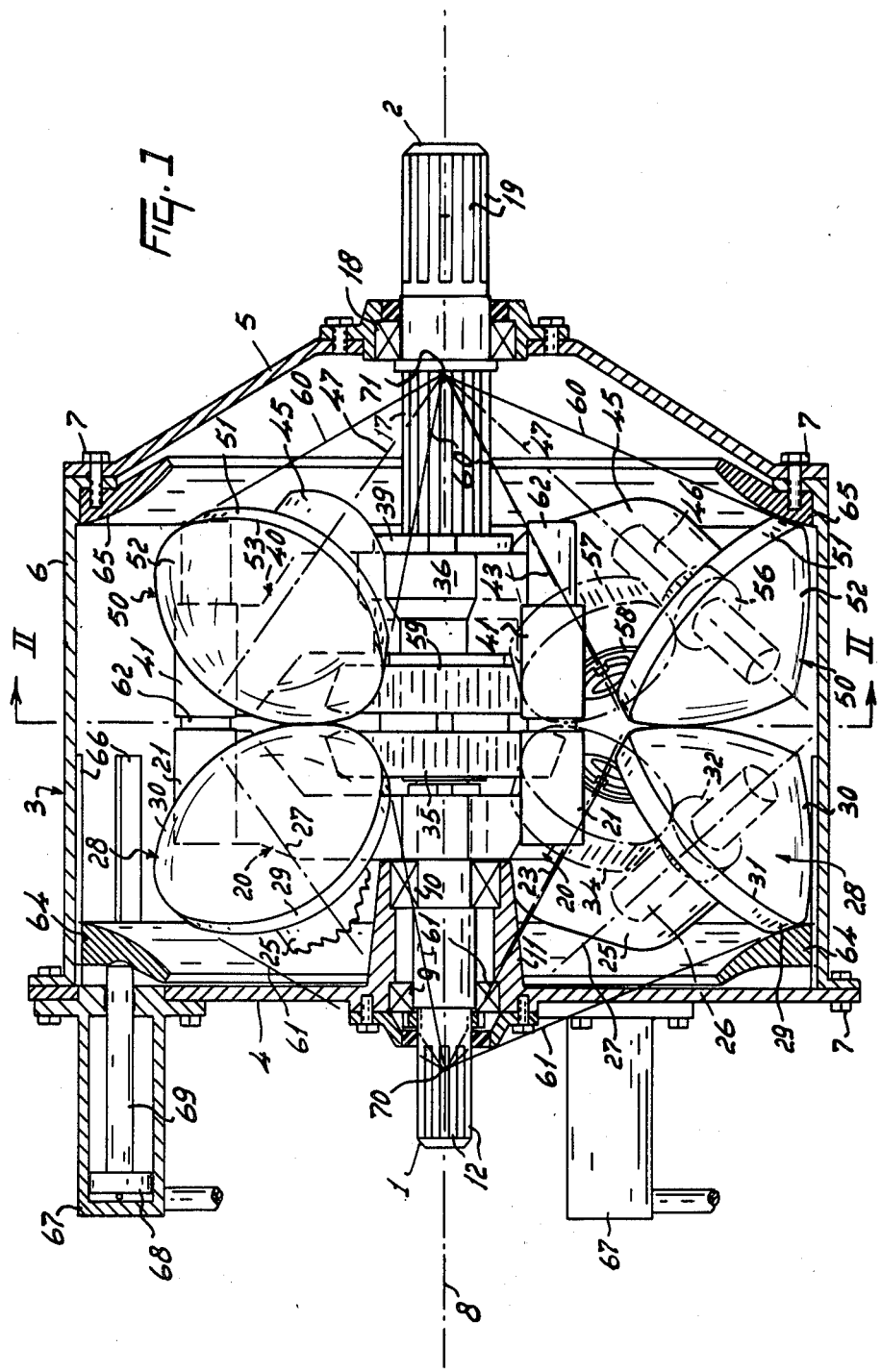
FIG. 1 is a partly sectioned side view of the torque converter.

The input shaft 1 is supported by two axially spaced bearings 9 and 10 in a sleeve 11 which is part of the end portion 4 and is coaxial with the input shaft 1 (FIG. 1).

The part of the input shaft 1 which projects from the housing 3 has axial splines 12, for receiving a coupling wheel or gear wheel to which the input torque is applied. At the end of the sleeve 11 facing the shaft 2, the shaft 1 has further axial splines 13 (FIG. 3) over part of its length. The end of the shaft 1 facing the driven shaft 2 is supported by the shaft 2, and for this purpose the shaft 1 has a spigot carrying a bearing 14, the outer race of which is received in a cavity 15 in the end of the shaft 2 facing the shaft 1.

Near the end of the shaft 2 facing the shaft 1, the shaft 2 has axial splines 16, and the part of the shaft 2 between the splines 16 and the end portion 5 has axial splines 17, the outer diameter of which slightly exceeds that of the splines 16. The splines 17 extend as far as a bearing 18 (FIG. 1), which supports the driven shaft 2 in the end portion 5 of the housing 3. For reasons to be explained later, the bearings 9 and 18 need to be capable of absorbing comparatively heavy axial forces, and may therefore, for example, be tapared roller bearings. The part of the driven shaft 2 projecting from the housing 3 has axial splines 19, so that the shaft 2 can be provided with means for delivering the output torque to further implements or parts of a vehicle.

The part of the input shaft 1 provided with the splines 13 has fastened to it a holder 20 having a central bore with internal splines co-operating with the splines 13 of the shaft 1. The holder 20 is axially retained on the driving shaft 1 by a locking ring 21A and by the sleeve 11.

The holder 20 has three identical arms distributed regularly about the main axis 8. This can be appreciated from FIG. 2, which shows a further holder to be described later, which is substantially identical to the holder 20. Each of the arms of the holder 20 is provided with a sleeve 21 (FIGS. 1 and 3), the centerline of which is spaced from and parallel to the main axis 8. Each of the three arms of the holder 20 also has a bore 22 (FIG. 3) located at a distance both from the associated sleeve 21 and from the main axis 8. The centerline 23 of the bore 22 (FIG. 3) is inclined to the main axis 8 and intersects it. The centerlines 23 of the three bores 22 of the holder 20 are located on a common conical surface, the vertex of which is located on the main axis 8 and the axis of which coincides with the main axis 8. Each of the bores 22 of the holder 20 receives a pin 24, which is coaxial with the centerline 23. The material of the holder 20 around each bore 22 is removed over part of the length of the bore so that an arm 25 journalled on the pin 24 can pivot with respect to the holder 20. Therefore, the holder 20 has three arms 25, which are pivotable with respect to the holder about the associated pivotal axes 23. Near the end of each arm 25 away from its pin 24 the arm 25 carries a rotary shaft 26 (FIG. 1), which is also inclined to the main axis 8. The centerline 27 of the rotary shaft 26 intersects the pivotal axis 23 and the main axis 8 at the same point, regardless of the position of the arm 25 with respect to the holder 20. Thus the centerline 27 of the rotary shaft 26 is invariably located on a conical surface, the vertex of which coincides with that of the conical surface containing the centerlines 23, and the centreline of which coincides with the centreline 23 of the bore 22. On the end of the rotary shaft 26 nearer the housing portion 6 there is a friction element 28, which is freely rotatable on its arm 25.

Each of the three friction elements 28 on the holder 20 has two friction surfaces 29 and 30 (FIG. 1), which meet at a common circle 31. The friction surface 29 of the friction element 28 is nearer the arms 25 and forms part of a conical surface, the axis of which coincides with the centreline 27 and the vertex of which is located at the point of intersection of the main axis 8, the centreline 27 of the rotary shaft 26, and the pivotal axis 23. The friction surface 30 of the friction element 28 is nearer the housing portion 6 and as viewed in a cross-section through the centerline 27, is curved and thus appears approximately spherical when viewed from the adjacent part of the housing portion 6. The friction surface 30 is rotationally symmetrical about the centerline 27 of the rotary shaft 26, and is constituted by a conical surface with a curved generatrix.

Figure 3:
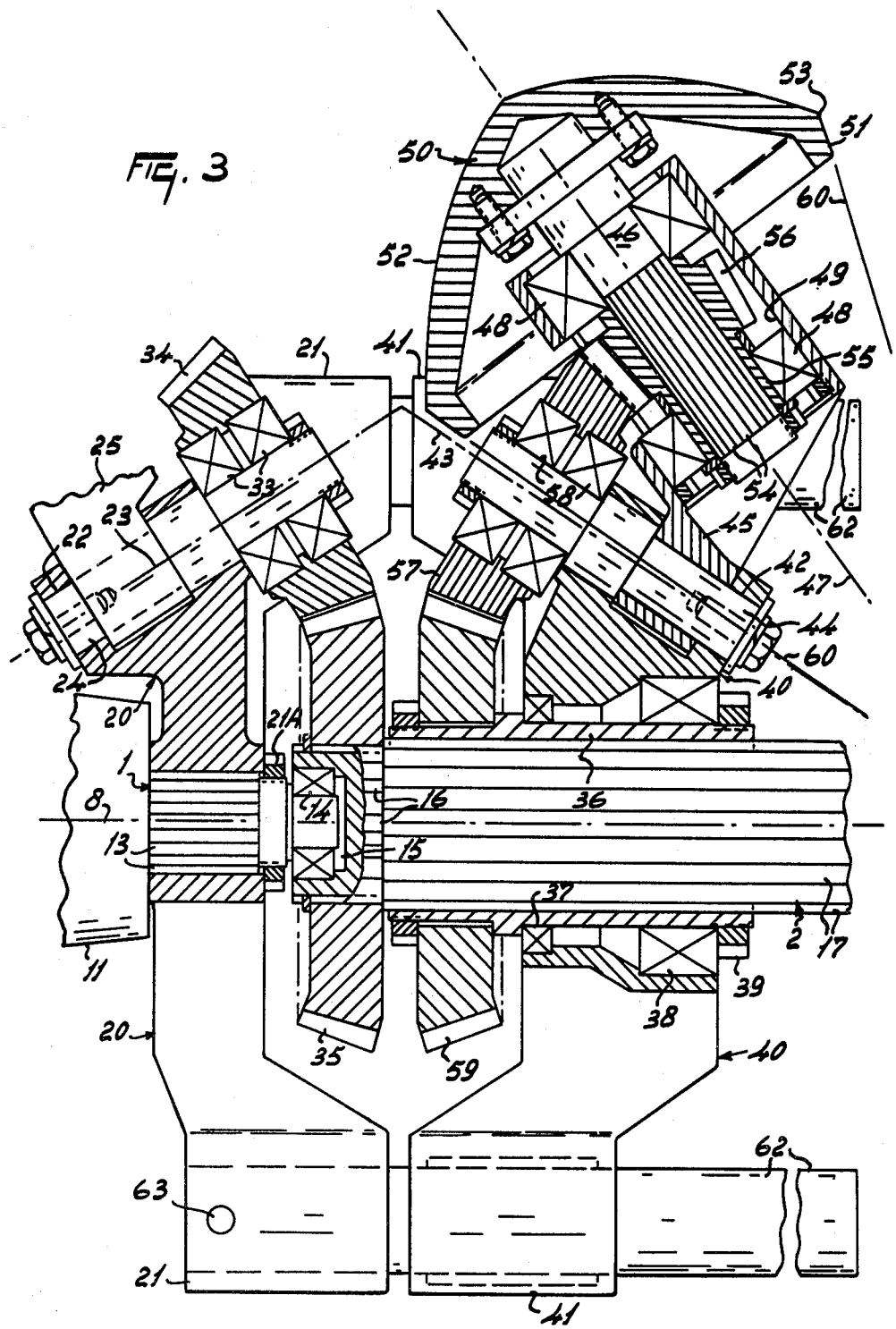
FIG. 3 is a sectional view taken on the lines III—III in FIG. 2.

A bevel pinion 32 is rigidly connected to the rotary shaft 27 and to the friction element 28 (FIG. 1). A further bevel pinion 34 is mounted rotatably on the associated pin 24 by bearings 33, and the pinions 32 and 34 mesh with one another. The three pinions 34 associated with the three friction elements 28 all mesh with a common central pinion or sun wheel 35, which is coaxial with the main axis 8. The pinion 35 is rigidly connected with the output shaft 2 by the splines 16 (FIG. 3).

Figure 2:
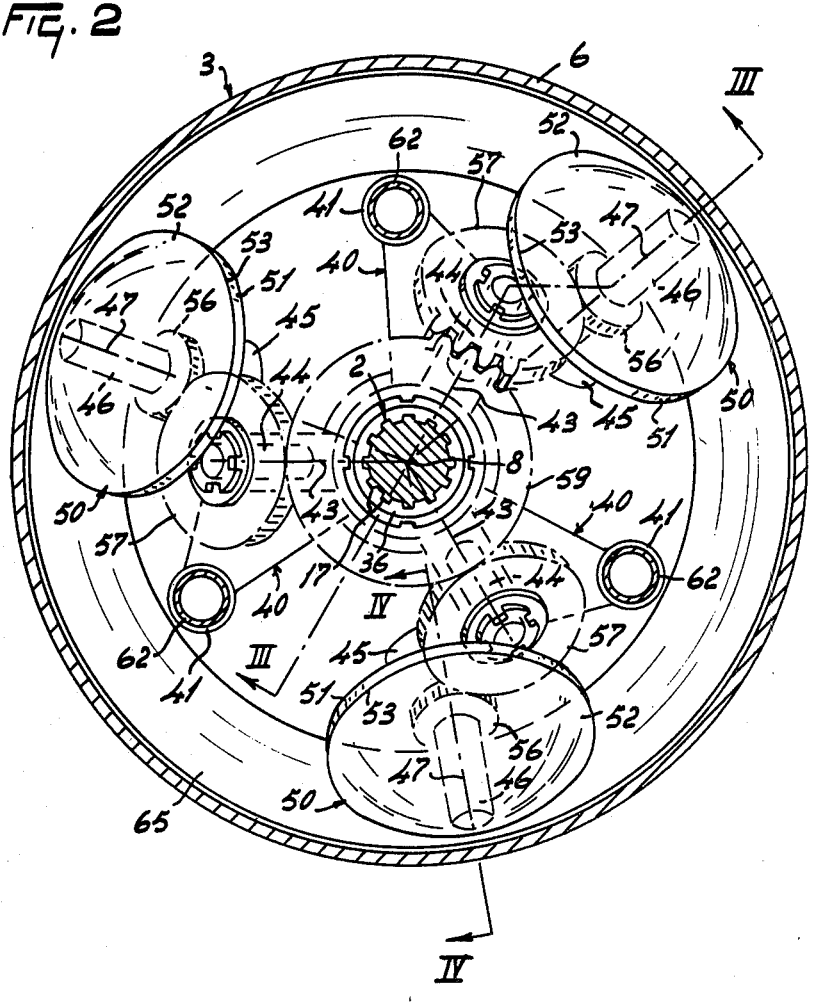
FIG. 2 is a sectional view taken on the line II—II in FIG. 1.

The part of the driven shaft 2 provided with the splines 17 is surrounded by a generally cylindrical sleeve 36 having internal splines co-operating with the splines 17. Therefore, the sleeve 36 can move only axially with respect to the shaft 2. The sleeve 36 is surrounded by axially spaced bearings 37 and 38, the inner races of which engage the outer surface of the sleeve 36. The bearing 37 is a ball bearing, but the bearing 38 is a tapered roller bearing to withstand the axial forces generated in operation. The bearings 37 and 38 are fixed axially on the sleeve 36 on the one hand by a shoulder of the sleeve 36 and on the other hand by a retaining ring 39. The outer races of the bearings 37 and 38 support a holder 40, which is identical to the holder 20 and also has three arms regularly spaced about the main axis 8 (FIG. 2). As with the holder 20, each arm of the holder 40 has a sleeve 41, the centerline of which is spaced from and parallel to the main axis 8. Each arm of the holder 40 has a bore 42 (like the bore 22 of the holder 20) the centerline 43 of which (FIG. 3) is inclined to the main axis 8 and intersects it. The three centerlines 43 of the three bores 42 of the holder 40 are located on a conical surface, the vertex of which is located on the main axis 8 and the axis of which coincides with the main axis 8. The bore 42 receives a pin 44, which is coaxial with the centerline 43 of the bore 42. Part of the material surrounding the bore 42 is removed so that an arm 45 journalled around the pivotal shaft or pin 44 can pivot with respect to the holder 40. A rotary shaft 46 is freely rotatable in the arm 45. The centerline 47 of the rotary shaft 46 intersects the main axis 8 at the point where the centreline 43 of the pivotal shaft 44 intersects the main axis 8. Since the arm 45 is freely pivotable with respect to the holder 40, the centerline 47 of the rotary shaft 46 is located, in all positions of the arm 45, on a conical plane, the axis of which coincides with the centerline 43 of the bore 42, and the vertex of which coincides with the point of intersection of the centerline 43 and the main axis 8 in the same way as the corresponding parts of the holder 20 (i.e. the arms 25, the pivotal shaft 24, the rotary shaft 26).

The rotary shaft 46 is supported by two axially spaced bearings 48 in a bore 49 of the arm 45. The end of the rotary shaft 46 away from the shaft 2 is provided with a friction element 50, which is freely rotatable with respect to the arm 45. As with the friction elements 28, each friction element 50 has two friction surfaces 51 and 52 meeting at a common circle 53. The friction surfaces 51 and 52 are of the same form as the friction surfaces 29 and 30 of the friction element 28.

Like the holder 20, the holder 40 has three pins 44 regularly spaced apart around the main axis 8 and three friction elements 50 pivotable about the pins 44.

Part of the length of the rotary shaft 46 has axial splines 54 and is surrounded by a sleeve 55 having a splined internal bore co-operating with the spline 54. Part of the sleeve 55 is constructed in the form of a bevel pinion 56, meshing with a bevel pinion 57 which is mounted on bearings 58 for free rotation about the pivotal shaft 44. The bearings 58 are preferably formed by tapered roller bearings. All three bevel pinions 57 of the holder 40 mesh with a central pinion or sun wheel 59, which is coaxial with the main axis 8 and which is rigidly secured by means of splines on the sleeve 56 (FIG. 3).

The holder 40, the three associated arms 45, the three friction elements 50, the pinions 56, 57 and 59 are axially secured to the sleeve 36 and are axially displaceable in common along the shaft 2 by sliding the sleeve 36.

The arms of the holder 40, the disposition of the pivotal shafts 44, the shape of the arms 45, the structural form and bearing of the rotary shaft 46, the pinions 56, 57, 59 and the three friction elements 50 are identical in shape, disposition and size to the corresponding elements of the holder 20. Therefore the groups of parts are substantially symmetrical about a plane perpendicular to the main axis 8 and between the holders 20 and 40.

It should be noted that the conical surface, part of which is formed by the friction surface 51 of the friction element 50, is designated in FIGS. 1, 3 and 4 to 6 by reference 60. The vertex of the conical surface 60 is located on the main axis 8 and in all positions of the friction friction element 50 the centerline 47 of the rotary shaft 46 of the element 50 as well as the centerline 43 of the pivotal shaft of the arm 45 pass through the vertex of the conical surface 60. The conical surface of which part is formed by the conical surface 29 of the friction element 28, is designated in FIGS. 1, 4, 5 and 6 by reference 61.

All diameters of the bores of the sleeves 21 and 41 on the arms of the holders 20 and 40 respectively are equal to one another. The centerline of the sleeves 21 and 41 are aligned in pairs. Through each pair of sleeves 21 and 41 passes a connecting element in the form of a tube or rod 62, the centerline of which is parallel to the main axis 8. Each of the three tubes or rods 62 is fixed by a pin 63 (FIG. 3) to the associated sleeve 21. The sleeves 41 of the holder 40 are axially slidable along the tube or rod 62. Therefore, the holder 40 and the sleeve 36 and all parts fastened thereto are axially displaceable with respect to the holder 20 and the parts secured thereto. The proportions of the sleeves 21 and 41 and of the tubes or rods 62 are such that these parts can transfer a driving torque from the holder 20 to the holder 40 without impeding relative axial movement.

The housing 3 has two internal control rings 64 and 65 (FIGS. 1, 2, 4, 5 and 6). These control rings 64 and 65 are coaxial with the main axis 8 and are parallel to a plane normal to the main axis 8. The control rings 64 and 65 are disposed so that the frictional elements 28 and 50 are located in the space formed between them. The dimensions of the control rings 64 and 65 are the same and they are disposed symmetrically. The outer diameters of the control rings 64 and 65 are approximately equal to the inner diameter of the cylindrical portion 6 of the housing 3. The control ring 65 is rigidly secured to the housing 3 by the bolts 7. The control ring 64 has at its outer periphery a plurality of slots engaging a plurality of guides 66 (For example, three, FIG. 1), which are fixed to the inner side of the cylindrical housing portion 6. The guides 66 are parallel to the main axis 8. The control ring 64 is axially displaceable along the guides 66 and remains parallel to itself during this displacement. In order to achieve this axial displacement, a plurality of hydraulic rams 67 (for example, three) are arranged on the outer side of the housing portion 4, these rams being connected with a hydraulic pump associated with the driving mechanism of which the torque converter is part. The driving mechanism may be for example, stationary equipment or in a vehicle. Each hydraulic ram 67 comprises a piston 68, having a piston rod 69 which extends parallel to the main axis 8. The piston rod 69 of each hydraulic ram 67 extends through a sealed aperture in the wall which separates the hydraulic ram 67 from the space inside the housing 3. The end of the piston rod 69 away from the piston 68 is hemispherical and is located in a correspondingly shaped recess in the control ring 64 on the side away from the control ring 65. In a sectional view including the main axis 8, the rotationally symmetrical control rings 64 and 65 are identical. The distance between the control rings 64 and 65 measured in a direction parallel to the main axis 8 near the outer peripheries of the control rings is smaller than the corresponding distance near their inner peripheries. The oppositely facing friction surfaces of the control rings 64 and 65, which are engaged by the friction elements 28 and 50 respectively, as will be explained more fully later are curved. This shape is clearly shown in FIGS. 1, 4, 5 and 6. Viewed from a spot located between the control rings 64 and 65 these oppositely facing surfaces are curved slightly spherically.

During operation the shaft 1 is driven by a prime mover, for example, the engine of a vehicle such as an agricultural tractor. This driving torque is transferred via the splines 13 of the shaft 1 to the holder 20 and through the three sleeves 21 of the holder 20 and the three tubes or rods 62 to the sleeves 41 and hence also the holder 40 surrounding the shaft 2. Although the holder 40 surrounds the shaft 2, it is directly driven together with the holder 20 by the input driving torque. The holder 40 thus rotates on the bearings 37 and 38 around the sleeve 36. The sleeve 36 rotates by virtue of its connection, via the splines 17, with the output shaft 2 which usually has a speed differing from that of the input shaft 1.

As a result of the rotation of the holders 20 and 40, centrifugal forces are exerted on the arms 25, 45, on the friction elements 28, 50 which are freely rotatable on them, and on the various parts which connect the friction elements to the arms 25 and 45. As a result of these centrifugal forces and of the convergence of the three pivotal axes 23 and 43 towards the ends of the shafts 1 and 2 respectively located outside the housing 3, the arms 25 and 45 located between the control rings 64 and 65 and the friction elements 28 and 50 turn outwardly about the associated pivotal shafts 24 and 44 respectively until the friction elements 28 and 50 engage the friction surfaces of the control rings 64 and 65 respectively. The position of the friction element 28 is determined by the position of the control ring 64, since the pivotal shaft 24 occupies a fixed axial position relative to the input shaft 1, the holder 20 being retained between the sleeve 11 and the retaining ring 21A. However, the friction elements 50 are axially displaceable with respect to the shafts 1 and 2, because these friction elements 50 together with the associated arms 45, the holder 40 and the pinions 57 and 59 are arranged on the sleeve 36, which is slidable along the splines 17 of the shaft 2. When the friction elements 50 turn outwardly about the pivotal shafts 44 under the action of the centrifugal forces they come into contact with the friction surface of the control ring 65, but they tend to move further outwards despite their contact with the control ring 65. This is possible because, as stated above the friction elements 50 are slidable along the shaft 2. The movement of the sleeve 36 along the shaft 2 continues until each friction element 50 comes into contact with a corresponding friction element 28 (FIGS. 1, 4, 5 and 6). The displacement of the fastening construction of the friction elements 50 along the shaft 2 thus allows these friction elements to move in between the control ring 65 and the corresponding friction elements 28. Consequently, for each set distance between the control rings 64 and 65 a disposition is obtained in which the control rings 64 and 65 and the friction elements 28 and 50 are disposed symmetrically about a plane normal to the main axis 8 and going through the points of contact between the friction elements 28 and 50.

The centerlines of the rotary shafts 26 and 46 of the friction elements 28 and 50 intersect one another during operation at a distance from the main axis 8, and each of these centerlines also intersects the main axis 8.

During the rotation of the friction elements 28 and 50 about the main axis 8, these friction elements roll along the friction surfaces of the control rings 64 and 65 respectively and roll one along the other rotating about their rotary shafts 26 and 46. With their conical friction surfaces 29 and 51, the friction elements 28 and 50 roll along the friction surfaces of the control rings 64 and 65 respectively and by their friction surfaces 30 and 52 respectively one along the other.

The contact pressure during operation between, on the one hand, the conical friction surfaces 29 and 51 of the friction elements 28 and 52 and, on the other hand, the friction surface of the control rings 64 and 65 results in a contact area in the form of a thin line, since the materials employed will always behave somewhat elastically. This contact area will be termed in this description a "linear contact area". The projected linear contact area between the friction element 28 and the friction surface of the control ring 64 and the projected linear contact area between the friction element 50 and the friction surface of the control ring 65 intersect the main axis 8 at the same point (70, 71) as the centerline 27 of the rotary shaft 26 of the friction element 28 and the centerline 47 of the rotary shaft 46 of the friction element 50, respectively. The centerlines 23 and 43 of the pivotal shafts 24 and 44 of the arms 25 and 45 respectively also intersect the main axis 8 at the points 70, 71. The shape of the curved friction surfaces of the control rings 64 and 65 is designed so that these geometrical conditions are satisfied in any relative position of the control rings 64 and 65.

As stated above, the friction elements 28 and 50 roll along the friction surfaces of the control rings 64 and 65 and also one along the other. Owing to this rolling movement of the friction elements 28 and 50 the pinions 32 and 56 rigidly secured to the friction elements are rotated about the centerlines 27 and 47 respectively.

The three pinions 34 and the three pinions 57 (operating as planetary wheels) drive, in turn, the central pinions or sunwheels 35 and 59 respectively. The sunwheel 35 transmits its rotation to the shaft 2 through the splines 16. The sunwheel 59 transmits its rotation through splines to the sleeve 36, which, in turn, is rotationally fastened by the splines 17 to the shaft 2. Therefore, the rolling movement of the friction elements 28 and 50 produces rotation of the output shaft 2.

When, in the position of the friction elements shown in FIGS. 1 and 4, the hydraulic rams 67 are pressurised the piston rods 69 will displace the control ring 64 towards the control ring 65, the control ring 64 sliding along the guide 66. Thus an infinite number of positions of the friction elements 28 and 50 relative to one another can be achieved, the circumference of the circle traced by the linear contact areas between the friction elements and the control rings then varying steplessly so that the speed of revolution of each of the friction elements about the associated rotary shaft 27 and 47 respectively also varies steplessly. By displacing the control ring 64 with respect to the housing 3 and with respect to the control ring 65 the speed of rotation of the output shaft 2 is infinitely variable, with a constant input shaft speed, via the planetary gear wheel systems 32, 34, 35 and 56, 57, 59 respectively.

In any set position of the control ring 64, the friction element 28, while turning about the centerline 23 of its pivotal shaft, will engage the control ring 64 in the new position (see FIG. 5) and each of the friction elements 50, while turning about the centerline 43 of its pivotal shaft 44 and sliding along the shaft 2 owing to the centrifugal force exerted thereon, will move between the friction surface of the control ring 65 and one of the friction elements 28. In the case of an adjustment in the reverse direction, one friction element is displaced by the contact pressure of the other friction element. In any of these positions the projected linear contact area between the friction element 28 and the friction surface of the control ring 64, the centerline 27 of the rotary shaft of the friction element 28, the centerline 23 of the pivotal shaft of the friction element 28 and the main axis 8 all intersect one another at the same point 70. This point has a fixed location with respect to the shaft 1. Likewise the projected linear contact area between each of the friction elements 50 and the control ring 65, the centerline 47 of the rotary shafts of the friction elements, the centerlines 43 of the associated pivotal shafts of the friction elements and the main axis 8 all intersect one another at the point 71. It will be apparent from the foregoing that the location of the point of intersection 71 depends upon the setting of the control ring 64 with respect to the housing 3 and is variable along the main axis 8. The projected linear contact areas between two friction elements 28 and 50 intersect the main axis 8 at right angles in any setting of the control ring 64. From the foregoing it will be apparent that the friction elements 28 and 50 will engage the control rings 64 and 65 by centrifugal forces. By a suitable choice of the inertia of the friction elements 28 and 50 and of the associated arms 25 and 45 it can be ensured for any input speed that the friction elements roll along the control rings 64 and 65 without slip, the choice of the magnitudes of these masses depending, of course, upon the co-efficient of friction between the friction elements and the friction surfaces of the control rings.

As a result of the fact that the projected linear contact areas between the friction elements and the friction surfaces of the control rings, the rotary axes of the friction elements and the associated centerlines 23 and 43 of the pivotal shafts of the friction elements, and the main axis 8 all intersect at one point, it is ensured that, in any of the possible positions, slip will not occur between the friction elements and the control rings throughout the length of each of the linear contact areas between the friction elements and the friction surfaces of the control rings. Therefore, at any speed of the driven shaft 2 the transmission may be considered as being free of loss, apart from that resulting from the small elastic deformation at the linear contact areas.

During operation the inclined positions of the pivotal shafts 24 and 44 of the friction elements 28 and 50 with respect to the main axis 8 result in high axial components of the centrifugal forces which may constitute a heavy load on the bearings of the friction elements with respect to the shafts 1 and 2 respectively. Therefore, in the case of high powers and/or high speeds the bearings of such torque converters may be overloaded if simple bearings were used, or high friction losses may be produced in the bearings. Since in accordance with the invention the friction elements 28 and 50 support one another pairwise in an axial direction, a substantial part of these heavy axial loads on the bearings supporting the friction elements with respect to their shafts are avoided because each friction element directly absorbs the axial component of the contact pressure of the other friction element of the friction surface of its control ring so that these axial components will not be applied to the bearings of the friction elements.

It is shown in this embodiment that only one control ring 64 of the two control rings 64, 65 is displaceable with respect to the housing 3, whereas the other control ring 65 is fixed in place with respect to the housing. This makes the adjustment simpler and more accurate, but it would be possible for both control rings to be displaceable.

FIG. 6 shows an embodiment of the friction elements 28 and 50, in which the friction surface 30 of the friction element 28 has a plurality of annular ridges on its curved surface. The ridges 72 are parallel to a plane perpendicular to the centerline 27 of the rotary shaft 26 of the friction element. The ridges 72 can engage annular grooves 73 in the friction surface 52 of the friction element 50. The distance between the ridges 72 on the friction surface 30 and the corresponding grooves 73 in the friction surface 52 is chosen so that in any relative position of the friction elements 28 and 50 at least one of the ridges 72 is in engagement with a groove 73. This disposition may be important for relatively fixing the three pairs of friction elements 28 and 50 during operation, particularly in the event of wear of the surfaces resulting from impact at the beginning or end of power transmission. Since an undesirable displacement between the friction elements 28 and 50, which would result in a non-symmetrical disposition, might produce a deviation from the linear contact area between one of the friction elements and the associated control ring with respect to the geometrically correct location of this contact area (this deviation would, in general, be half the relative displacement of the friction elements themselves), such a fixing mode may be desirable under given conditions.

The torque conveter described above is capable of transferring a power of about 150 HP, substantially without mechanical loss, with a diameter of the cylindrical housing 6 of about 50 cms. Each of the friction elements should then have a weight of not more than about 3 kilogrammes. With a speed of the input shaft 1 of about 2400 rev/min. the output shaft 2 can be driven with a continuously variable speed in the range 115 to 575 rev/min.

The above-mentioned geometrical relationship, such as the inersection of lines at a given point, have to be considered in the light of technical realities. Those given are subject variations of a manufacturing or technical nature and to differences due to wear and tear or to rough handling. The requirement for lines to intersect at one point, therefore, must be taken to be a theoretical optimum, while, in practice, deviations from this are to be expected.

While various features of the torque converter that have been described, and that are illustrated in the drawings, will be set forth in the following claims as inventive features it is to be noted that the invention is not necessarily limited to these features and that it encompasses all of the features that have been described both individually and in various combinations.

What we claim is:

1. A torque converter comprising an input and an output that are drivenly interconnected through respective friction elements, said input and output being rotatable about a common main axis and the input and output each having at least one respective friction element that is mounted for rotation about a corresponding rotary axis that is inclined to said main axis, the at least two elements having friction surfaces that engage one another and control means of said converter during operation, said elements being displaceable outwardly from said main axis by centrifugal force to roll on one another and on said control means during rotation about their corresponding rotary axes.

2. A torque converter as claimed in claim 1, in which said elements are pivotable to frictionally engage one another whereby, a major proportion of the axial forces exerted on said elements are in a state of equilibrium.

3. A torque converter as claimed in claim 2, in which each element engages the other element over a substantially linear contact area.

4. A torque converter as claimed in claim 3, in which said contact area between the friction elements substantially intersects said main axis.

5. A torque converter as claimed in claim 4, in which said contact area is substantially perpendicular to said main axis.

6. A torque converter as claimed in claim 1, in which each element has friction surfaces and said surfaces are inclined to one another.

7. A torque converter as claimed in claim 6, in which each element is positioned to make rolling contact with the other element on a respective first friction surface, a second friction surface of each element engaging a respective friction surface of a member of said control means, said control member being stationary with respect to a housing of said converter.

8. A torque converter as claimed in claim 7, in which each friction element engages a friction surface of a respective control member over a substantially linear contact area.

9. A torque converter as claimed in claim 8, in which the contact area between each element and the respective control member substantially intersects said main axis.

10. A torque converter as claimed in claim 9, in which said contact area between each element and respective control member substantially intersects the rotary axis of that member.

11. A torque converter as claimed in claim 10, in which said contact area between each element and said control member intersects said main axis and the rotary axis of that element at one point.

12. A torque converter as claimed in claim 11, in which at least one of the friction surfaces of each element is part of a substantially conical surface.

13. A torque converter as claimed in claim 12, in which the vertex of said conical surface substantially coincides with said point.

14. A torque converter as claimed in claim 13, in which one of the friction surfaces of each element is curved, as viewed in a cross-section taken through the respective rotary axis.

15. A torque converter as claimed in claim 1, in which the input and output each comprise a plurality of friction elements and each element has two friction surfaces, said elements being arranged between two control members within a housing of said converter.

16. A torque converter as claimed in claim 15, in which the rotary axes of the elements of said input substantially intersect the axes of the elements of said output at a location spaced from said main axis, the axes of each element substantially intersecting said main axis.

17. A torque converter as claimed in claim 16, in which at least one of said control members is displaceable in a direction substantially parallel to said main axis.

18. A torque converter as claimed in claim 17, in which the second control member is fixed with respect to said housing.

19. A torque converter as claimed in claim 18, in which each element is rotatably mounted on a shaft on a support and at least one support is displaceable in a direction parallel to said main axis.

20. A torque converter as claimed in claim 19, in which the supports of said elements are pivotably mounted with respect to said main axis, said friction elements being moveable outwardly by centrifugal force to contact one another and friction surfaces of the control members.

21. A torque converter as claimed in claim 20, in which the shaft of at least one element is pivotable under the action of contact pressure between said two elements.

22. A torque converter as claimed in claim 21, in which the support of each friction element is mounted for pivotal movement about a pivotal axis with respect to the input, and the pivotal axis of the support and the rotary axis of the respective element substantially intersect one another at a point on said main axis.

23. A torque converter as claimed in claim 1, in which the surfaces of said elements contact one another and surfaces of said control means, a contact area between said elements and a further contact area between each element and a respective control member of said control means being linear contact areas, the projected contact area between each friction element and its respective control member substantially intersecting said main axis.

24. A torque converter as claimed in claim 23, in which the projected contact area between each friction element and respective control member substantially intersects the projected rotary axis of that element.

25. A torque converter as claimed in claim 1, in which the projected contact area between each friction element and respective control member intersects said projected rotary axis and said main axis at one point.

26. A torque converter as claimed in claim 25, in which said elements are located within a housing and said control means includes two annular control members that encircle the main axis.

27. A torque converter as claimed in claim 26, in which the contact area between each friction element and respective control member forms part of a substantially conical surface of that element, the vertex of said conical surface being located on said main axis, at least in one position of that element, the axis of said conical surface substantially coinciding with the centerline of the rotary axis of the respective element.

28. A torque converter as claimed in claim 27, in which the projected contact area between each friction element and respective control member substantially intersects the rotary axis and a pivotal axis of said element, and said main axis at one point.

29. A torque converter comprising a housing, an input shaft and an output shaft that are drivenly interconnected through respective friction elements within said housing, the two shafts being rotatable about a common main axis and each shaft being geared to at least one respective friction element that is mounted for rotation about a corresponding rotary shaft, said rotary shaft being inclined to said main axis and the elements of said input and said output having friction surfaces that engage one another, respective annular control members being positioned adjacent the elements of said input and output shafts, said elements being displaceable outwardly from said main axis by centrifugal force to roll on one another and on said control members during rotation about their corresponding rotary shafts, each rotary shaft being held by an arm pivoted to a support and said support being freely rotatable about said main axis, said input and output shafts being geared to their respective elements by respective planetary gear systems.

* * * * *